(12) United States Patent
Tsugimura

(10) Patent No.: US 10,051,150 B2
(45) Date of Patent: Aug. 14, 2018

(54) IMAGE PROCESSING APPARATUS AND MEDIUM STORING PROGRAM EXECUTABLE BY COMPUTER

(71) Applicant: BROTHER KOGYO KABUSHIKI KAISHA, Nagoya-shi, Aichi-ken (JP)

(72) Inventor: Koichi Tsugimura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/393,964

(22) Filed: Dec. 29, 2016

(65) Prior Publication Data
US 2017/0223226 A1 Aug. 3, 2017

(30) Foreign Application Priority Data
Jan. 29, 2016 (JP) ................................ 2016-016559

(51) Int. Cl.
H04N 1/387 (2006.01)
H04N 1/00 (2006.01)

(52) U.S. Cl.
CPC ....... *H04N 1/3878* (2013.01); *H04N 1/00039* (2013.01); *H04N 1/00718* (2013.01); *H04N 1/00737* (2013.01); *H04N 1/00748* (2013.01); *H04N 2201/0081* (2013.01); *H04N 2201/0082* (2013.01)

(58) Field of Classification Search
USPC ...................................................... 358/1.18
See application file for complete search history.

(56) References Cited

U.S. PATENT DOCUMENTS

| | | | | |
|---|---|---|---|---|
| 2009/0010541 A1* | 1/2009 | Aihara | ................ | H04N 1/3878 382/173 |
| 2009/0073473 A1* | 3/2009 | Toyoda | .............. | H04N 1/00127 358/1.9 |
| 2011/0019246 A1* | 1/2011 | Kondo | ............... | H04N 1/00002 358/448 |
| 2013/0229695 A1* | 9/2013 | Lei | .......................... | H04N 1/38 358/448 |
| 2014/0146371 A1* | 5/2014 | Hayashi | ................ | H04N 1/506 358/474 |

FOREIGN PATENT DOCUMENTS

JP       2012-227569 A       11/2012

* cited by examiner

*Primary Examiner* — Ngon Nguyen
(74) *Attorney, Agent, or Firm* — Scully, Scott, Murphy & Presser, PC

(57) ABSTRACT

An image processing apparatus includes: a controller configured to perform: acquiring objective image data representing an objective image, the objective image data being obtained by optically reading a manuscript; analyzing the objective image data; generating an image processing command in which image processing to be executed for the objective image data is described, by using a result of analysis of the objective image data; and generating an image file including the objective image data and the image processing command. The image processing command is to be executed when a reproduction image is reproduced at a reproduction unit by using the image file.

12 Claims, 11 Drawing Sheets

FIRST EMBODIMENT

MANUSCRIPT

SCAN IMAGE (ORIGINAL IMAGE)

SCAN IMAGE (AFTER INCLINATION CORRECTION)

FIRST EMBODIMENT

FOREGROUND IMAGE

BACKGROUND IMAGE

OVERLAY IMAGE

REPRODUCTION IMAGE

SECOND EMBODIMENT

MANUSCRIPT

SCAN IMAGE (ORIGINAL IMAGE)

SCAN IMAGE (AFTER INCLINATION CORRECTION)

REPRODUCTION IMAGE

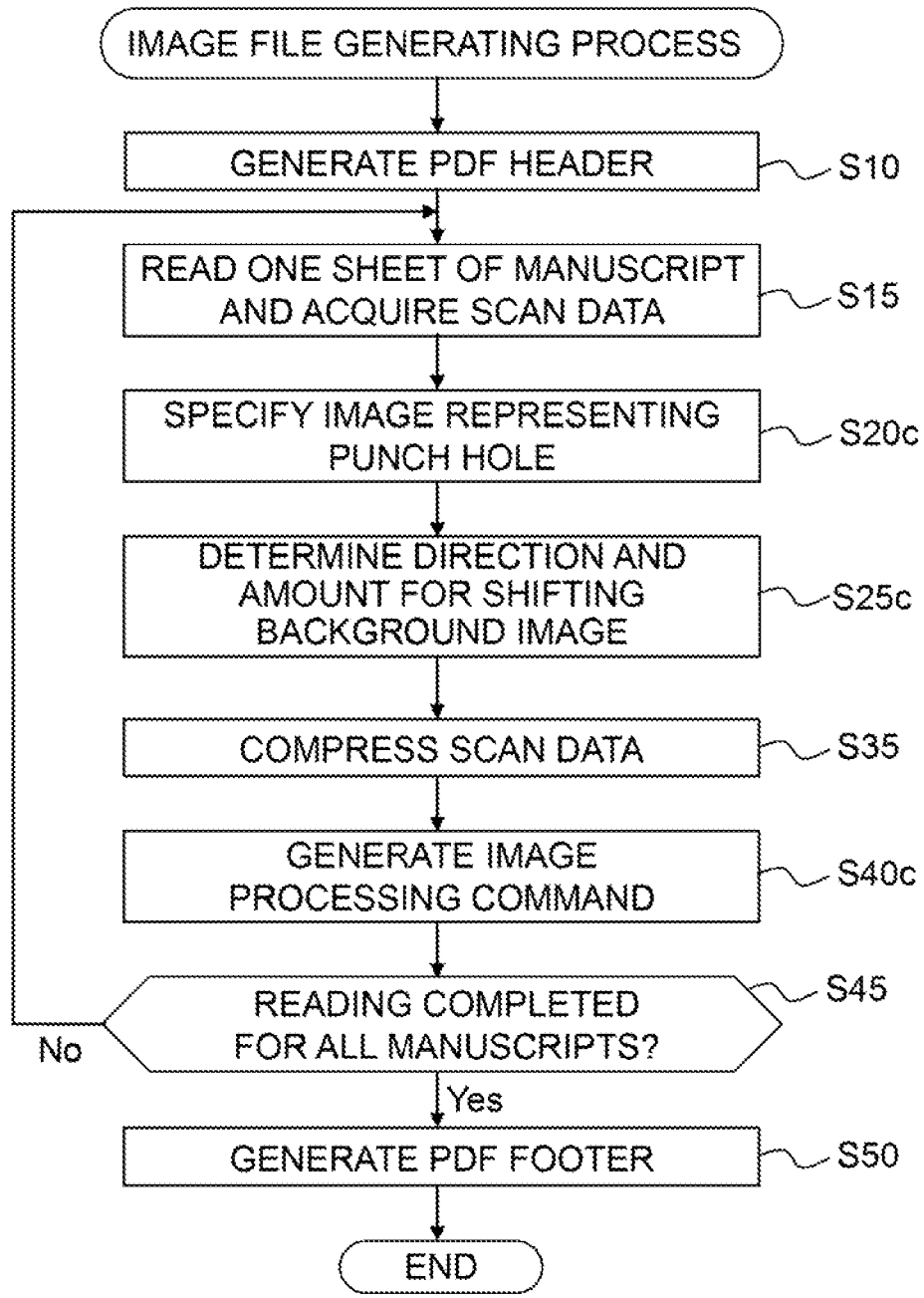

THIRD EMBODIMENT

MANUSCRIPT
(SCAN IMAGE,
BACKGROUND IMAGE)

(FOREGROUND IMAGE)

OVERLAY IMAGE (REPRODUCTION IMAGE)

IMAGE PROCESSING APPARATUS AND MEDIUM STORING PROGRAM EXECUTABLE BY COMPUTER

CROSS REFERENCE TO RELATED APPLICATION

The present application claims priority from Japanese Patent Application No. 2016-016559, filed on Jan. 29, 2016, the disclosure of which is incorporated herein by reference in its entirety.

BACKGROUND

Field of the Invention

The present invention relates to image processing for objective image data obtained by optically reading a manuscript or original copy.

Description of the Related Art

Such a technique is known that after an image data is obtained as bitmap data by optically reading a manuscript by using a scanner or the like, an inclination correcting process is performed for the image data and the corrected image data is stored in a memory, when the image data is reproduced. Accordingly, for example, it is possible to correct the inclination of an image caused by the inclination of the manuscript during the reading.

SUMMARY

In the meantime, such a technique different from the above has been demanded that an image file is generated to reproduce an image for which image processing is executed, by using image data obtained by optically reading a manuscript.

An object of the present teaching is to provide a new technique for generating an image file in order to reproduce an image for which image processing is executed, by using image data obtained by optically reading a manuscript.

According to an aspect of the present teaching, there is provided an image processing apparatus including: a controller configured to perform: acquiring objective image data representing an objective image, the objective image data being obtained by optically reading a manuscript; analyzing the objective image data; generating an image processing command in which image processing to be executed for the objective image data is described, by using a result of analysis of the objective image data; and generating an image the including the objective image data and the image processing command, wherein the image processing command is to be executed when a reproduction image is reproduced at a reproduction unit by using the image file.

According to the construction described above, the image processing command, in which the image processing to be executed for the objective image data is described, is generated by using the result of analysis of the objective image data, and the image file, which includes the objective image data and the image processing command, is generated. As a result, it is possible to generate the image file in order to reproduce the image obtained by executing the image processing, without executing the image processing for the objective image data to be stored in the image file, the objective image data being obtained by reading the manuscript.

Note that the present teaching can be realized in other various forms. The present teaching can be realized in forms of for example, an image reading apparatus, an image processing method, a computer program for realizing the function of the apparatus and the method, and a non-transitory recording medium on which the computer program is recorded. The non-transitory recording medium may include a storage unit which is mounted on a server capable of being connected to the image processing apparatus via a communication network, in addition to, for example, CD-ROM and DVD-ROM. Then, the program, which is stored in the storage unit of the server, may be delivered as the information or the signal which represents the program, via the communication network such as the internee or the like.

BRIEF DESCRIPTION OF THE DRAWINGS

FIG. 9 depicts a flow chart illustrating an image file generating process of a third embodiment.

DESCRIPTION OF THE EMBODIMENTS

First Embodiment

Figure 1:
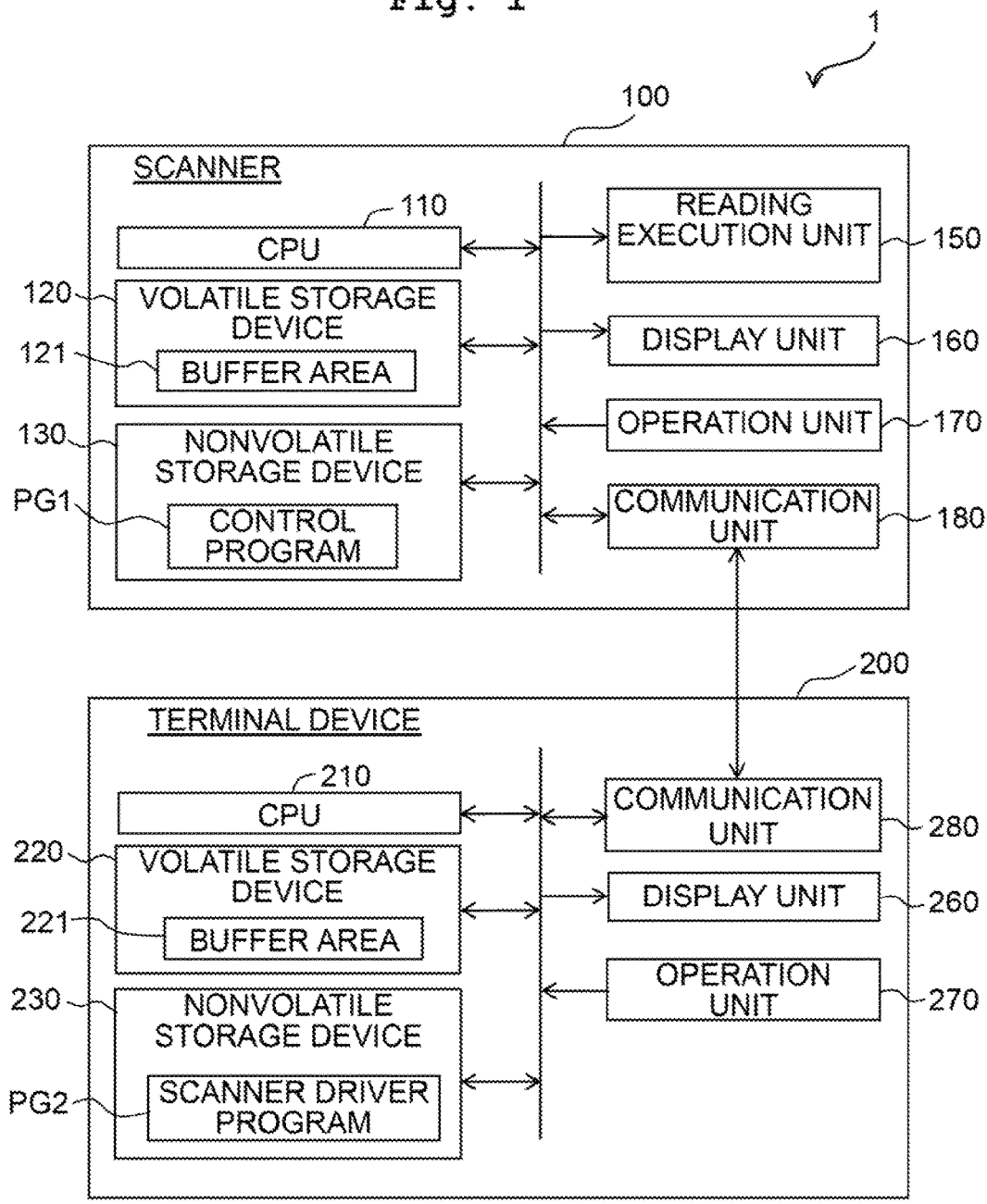
FIG. 1 depicts a block diagram illustrating arrangements of a scanner and a computer.

At first, an explanation will be made about the construction of an image processing apparatus. As depicted in FIG. 1, the image processing apparatus comprises a scanner 100 and a computer 200 which is connected to the scanner 100.

The scanner 100 comprises CPU 110 which serves as a controller for the scanner 100, a volatile storage device 120 which is ROM or the like, a nonvolatile storage device 130 which is a hard disk drive or the like, a reading execution unit 150, a display unit 160 which is a liquid crystal display or the like, an operation unit 170 which is buttons or a touch panel superimposed on the liquid crystal panel, and a communication unit 180. The scanner 100 is connected to an external apparatus such as the computer 200 or the like via the communication unit 180 so that the communication can be performed.

The volatile storage device 120 provides a buffer area 121 which temporarily stores various types of intermediate data generated when CPU 110 executes the process. A control program PG1 is stored in the nonvolatile storage device 130. The control program PG1 may be provided while being previously stored in the nonvolatile storage device 130 upon the production of the scanner 100. In place of the above, the control program PG1 may be provided in a form of being downloaded from a server connected via the internet or a form of being recorded on CD-ROM or the like.

CPU 110 executes the control of the scanner 100 by executing the control program PG1. For example, CPU 110 executes the process in which the reading execution unit 150 is controlled so that scan data (objective image data) is generated by the reading execution unit 150. Further, CPU 110 can execute an image file generating process as described later on.

The reading execution unit 150 generates the scan data by optically reading a manuscript by using an image sensor in accordance with the control performed by CPU 110. The reading execution unit 150 of this embodiment is provided with an automatic manuscript transport unit (Auto Document Feeder (ADF)) with which a plurality of sheets of the manuscript prepared by a user are automatically transported one by one by using the motive power of a motor.

The computer 200 is a terminal device which is, for example, a personal computer or a smartphone. The computer 200 comprises CPU 210 which serves as a controller of the computer 200, a volatile storage device 220 which is RAM or the like, a nonvolatile storage device 230 which is a hard disk drive or the like, a display unit 260 which is a liquid crystal display or the like, an operation unit 270 which is a mouse, a keyboard or the like, and a communication unit 280. The computer 200 is connected to an external apparatus such as the scanner 100 or the like via the communication unit 280 so that the communication can be performed.

The volatile storage device 220 provides a buffer area 221 for CPU 210. A scanner driver program PG2, which is provided to control the scanner 100, is stored in the nonvolatile storage device 230. The scanner driver program PG2 may be provided, for example, in a form of being downloaded from a server or a form of being recorded on DVD-ROM or the like. CPU 210 functions as a scanner driver by executing the scanner driver program PG2.

Figure 3:
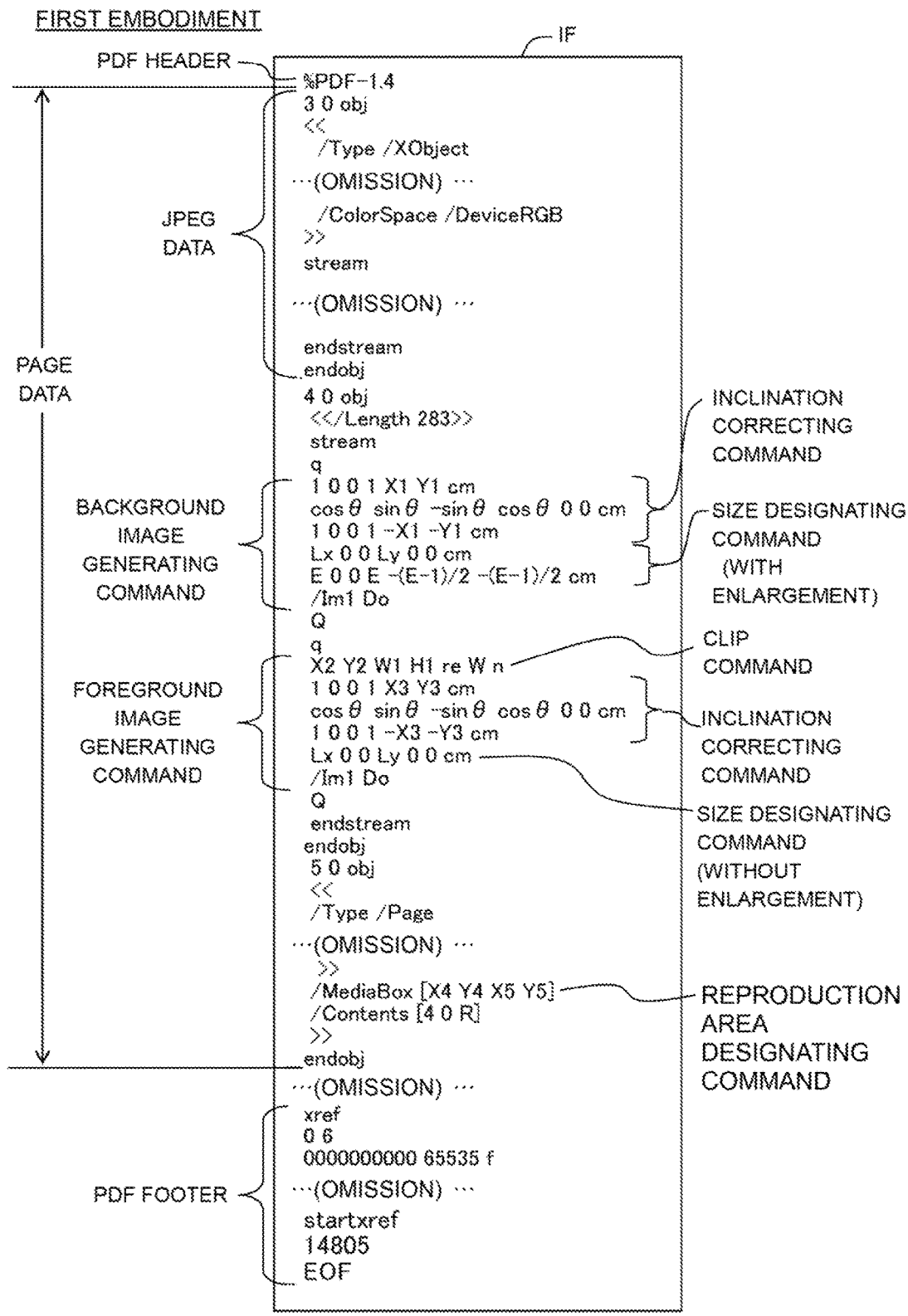
FIG. 3 depicts an example of an image file of the first embodiment.

Next, an explanation will be made about an image file generating process. The image file generating process is such a process that the scan data, which represents a scan image (objective image), is acquired from the reading execution unit 150, and the image file IF is generated by using the scan data. The image file IF depicted in FIG. 3 is a so-called PDF file which is written in accordance with the format of Portable Document Format (PDF).

The generated image file IF is stored, for example, in the nonvolatile storage device 230 of the computer 200. Then, in the computer 200, the image file IF is used to reproduce the image represented by the PDF file by means of a program (so-called PDF viewer) corresponding to the PDF format. The reproduction of the image includes, for example, the display of the image by the display unit 260 which serves as the reproducing unit 260 and the printing of the image by an unillustrated printer which serves as the reproducing unit.

The image file generating process is executed by CPU 110 of the scanner 100, if an instruction to read the manuscript for which the PDF file is designated as the storage format (saving format) is inputted by the user into the scanner by the aid of the operation unit 170. Note that the instruction to read the manuscript may be inputted into the scanner 100 by the aid of the computer 200 (CPU 210) which functions as the scanner driver.

In the image file generating process, CPU 110 generates the data for constructing the image file IF to progressively record the data in the buffet area 121, and thus the image file IF is generated.

In S10, CPU 110 generates the PDF header for designating the version number of PDF (FIG. 3), and the PDF header is recorded in the buffer area 221.

In S15, CPU 110 controls the reading execution unit 150 so that one manuscript, which is included in one or more manuscripts placed in the automatic manuscript transport unit, is optically read, and thus the scan data, which represents the scan image, is generated. Accordingly, CPU 110 acquires the scan data corresponding to one sheet of the manuscript. The scan data is the bitmap data which is constructed by a plurality of pixels arranged in a matrix form, specifically the RGB image data in which the color of each of the pixels is represented by the RGB value. The RGB value of one pixel includes the gradation values (hereinafter referred to as "component values" as well) of the three color components of red (R), green (G), and blue (B). In this embodiment, the number of gradations of each of the component values is 256 gradations.

In this embodiment, the scan image data is generated, which represents the scan image of the size corresponding to the manuscript size (for example, A4, A3 or the like) previously designated by the user.

Figure 4A:
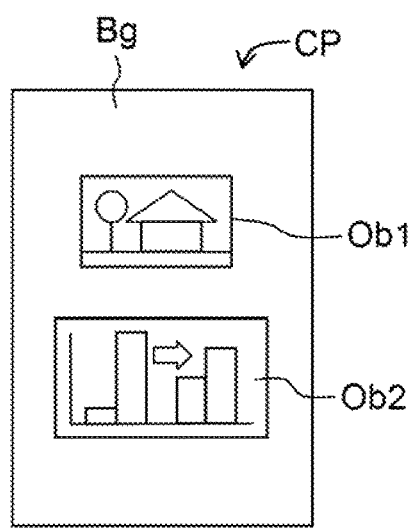
FIGS. 4A to 4C depict examples of a manuscript and an image of the first embodiment.
Figure 4B:
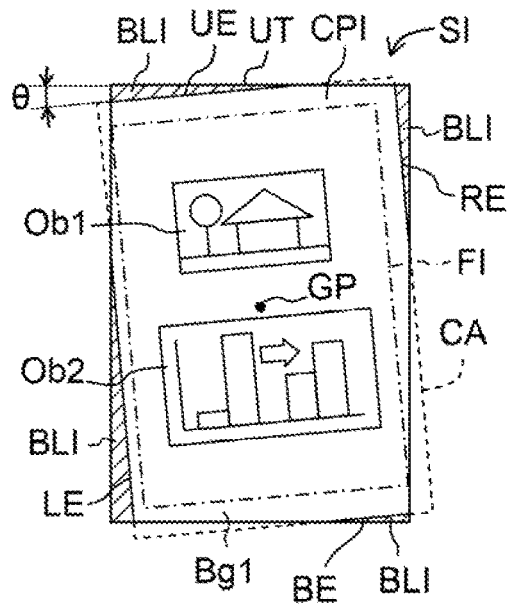

FIG. 4A depicts one sheet of manuscript CP. The manuscript CP includes a background Bg and a plurality of objects Ob1, Ob2. FIG. 4B depicts an example of the scan image SI represented by the scan data obtained by reading the manuscript CP depicted in FIG. 4A. The scan image SI depicted in FIG. 4B includes a manuscript image CPI which represents the manuscript CP and a blank space image BLI which is positioned outside the manuscript image CPI. The blank space image BLI can be also expressed as the image which is obtained by reading a manuscript stand (copy holder) that is disposed at a position opposed to the image sensor.

As depicted in FIG. 4B, the inclination of the manuscript image CPI can be expressed as the inclination of the corresponding side (for example, the upper side UE) of the manuscript image CPI included in the scan image SI with respect to the specified end (for example, the upper end UT) of the scan image SI. The inclination of the manuscript image CPI from the specified direction (for example, the horizontal direction) as described above results from the fact that the corresponding side of the manuscript CP is inclined with respect to the subsidiary scanning direction of the reading execution unit 150 (i.e., the transport direction of the manuscript) and the main scanning direction (i.e., the direction perpendicular to the transport direction of the manuscript) upon the reading performed by the reading execution unit 150. Further, the size of the scan image SI (corresponding to A4) is coincident with the size of the read manuscript CP. However, the manuscript CP is inclined and/or deviated during the reading, and hence the entire manuscript CP is not completely represented by the scan image SI. FIG. 4B depicts a rectangular area CA corresponding to the entire manuscript CP by using broken lines. As understood from the area CA, a part of the outer edge of the manuscript CP is not depicted in the scan image SI.

In S20 to S30, CPU 110 executes the analysis process for analyzing the scan data. The parameter, which is used when the image processing command is generated as described later on, is determined by the analysis process. The parameter may include, for example, the feature value (amount of characteristic) (for example, the inclination θ described later on) which represents the feature of the scan image SI.

In S20, CPU 110 analyzes the scan data, and CPU 110 thereby specifies the inclination of the manuscript image CPI described above from the specified direction (for example, the horizontal direction). Specifically, CPU 110 detects the upper side UE of the manuscript image CPI in relation to the scan image SI by detecting the edge which exhibits the boundary between the manuscript image CPI and the blank space image BLI that is different from the manuscript image CPI. CPU 110 specifies, as the inclination of the manuscript image CPI, the angle θ (FIG. 4B) between the upper end UT of the scan image SI and the detected upper side UE of the manuscript image CPI.

In S25, CPU 110 analyzes the scan data, and CPU 110 thereby determines the foreground image FI (FIG. 4B) in the scan image SI. As details will be described later, the foreground image FI is the image which represents a part of the manuscript image CPI, and the foreground image FI is the image which is generated as a part of the reproduction image when the image is reproduced by using the image file IF. Specifically, CPU 110 specifies the manuscript image CPI in relation to scan image SI by detecting the edge which exhibits the boundary between the manuscript image CPI and the blank space image BLI that is different from the manuscript image CPI. CPU 110 determines, as the foreground image FI, the inscribed rectangle which inscribes the manuscript image CPI, the inscribed rectangle being inclined by the angle θ specified in S20 (FIG. 4B). Specifically, CPU 110 specifies the rectangular area CA corresponding to the entire manuscript CP on the basis of the four sides UE, RE, LE, BE of the manuscript image CPI. Then, CPU 110 determines, as the foreground image FI, the image which has the center of gravity that is the center of gravity GP of the specified rectangular area CA, which is similar to the rectangular area CA, and which is included in the rectangular area that inscribes the manuscript image CPI. As a result, the foreground image FI is determined to have an appropriate size and a position so that the blank space image BLI is not included in the foreground image FI corresponding to the blank space image BLI.

It is preferable that the foreground image FI includes all of the objects disposed in the manuscript image CPI. Therefore, it is preferable that the foreground image FI is determined to have the size which is as large as possible. However, if the foreground image FI is determined to have the predetermined size, and the position, the following possibility arises. That is, if the blank space image BLI is relatively large on account of the large inclination of the manuscript image CPI, the blank space image BLI may be included in the foreground image FI. In this embodiment, as described above, the foreground image FI is dynamically determined depending on the blank space image BLI. Therefore, it is possible to determine the appropriate foreground image FI.

Figure 4C:
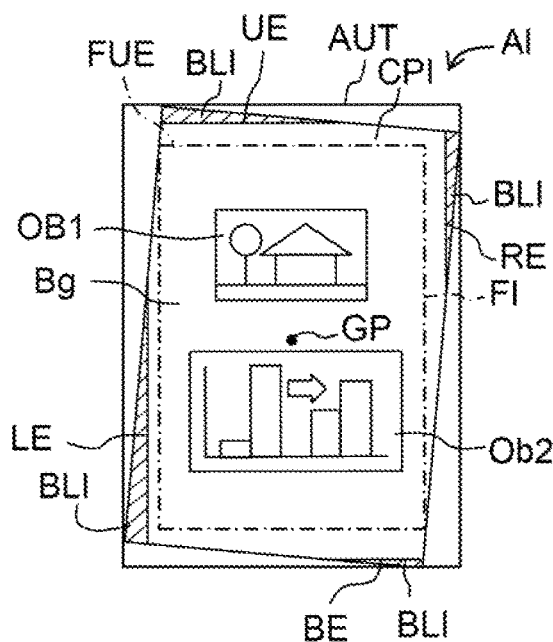

FIG. 4C depicts the inclination-corrected (inclination is already corrected) scan image AI which s obtained by rotating the scan image SI by the angle θ. In the corrected scan image the upper end AUT of the corrected scan image AI is parallel to the upper side UE of the manuscript image CPI included in the scan image AI. Further, in the corrected scan image AI, the foreground image FI is not inclined, and the upper end AUT of the corrected scan image AI is parallel to the upper side FUE of the foreground image FI. Note that the corrected scan image AI depicted in FIG. 4C is depicted in the drawing in order to understand the situation with ease. However, the image data, which represents the corrected scan image AI, is not actually generated as any data distinct from the scan data, in the image file generating process. That is, in the image file generating process, the process, in which the inclination of the scan image SI is corrected, is not actually performed.

In S30, CPU 110 determines the magnification Mr of the background image BI. As details will be described later, the background image BI is the image which represents at least a part of the manuscript image CPI, and the background image BI is the image which is generated at the magnification larger than that of the foreground image FI when the image is reproduced by using the image file IF. The size of the foreground image FI described above is smaller than the image size (i.e., the size of the scan image SI depicted in FIG. 4A or the size of the rectangular area CA) corresponding to the size of the manuscript CP (for example, A4). CPU 110 determines the magnification Mr (Mr>1) which is required to magnify or enlarge the size of the foreground image FI to the image size corresponding to the size of the manuscript CP, assuming that the size of the foreground image FI is "1". Accordingly, the magnification Mr of the background image BI is determined. In this way, the magnification Mr of the background image BI is also dynamically determined in accordance with the foreground image FI which is dynamically determined. As described above, the foreground image FI is dynamically determined depending on the blank space image BLI. Therefore, it is possible to affirm that the magnification Mr of the background image BI is also dynamically determined depending on the blank space image BLI.

Subsequently to the analysis processes of S20 to S30, in S35 CPU 110 compresses the scan data acquired in S15. Specifically, CPU 110 compresses the scan data by using the irreversible compression system suitable for the compression of the multi-gradation image, specifically the Joint Photographic Experts Group (JPEG) compression. In this way, the scan data is compressed without performing the image processing including, for example, the inclination correcting process and the enlarging process. The generated compressed scan data, which is the JPEG data in this embodiment (FIG. 3), is recorded, for example, in the buffer area 221 subsequently to the PDF header.

In S40, CPU 110 generates the image processing command in which the image processing to be executed for the scan data when the reproduction image DI is reproduced by using the image file IF is described, by using the result of the analysis process of S20 to S30.

Figure 5A:
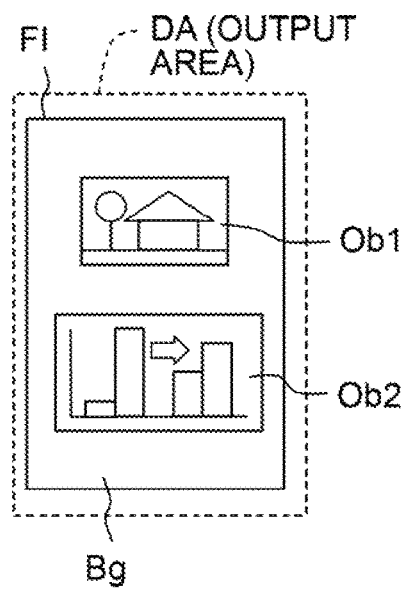
FIGS. 5A to 5D are diagrams for explaining a reproduction image of the first embodiment.

In order to understand the situation more easily, an explanation will now be made previously about the reproduction image DI to be reproduced by using the image file IF. As depicted in FIG. 5A, the foreground image FI is the image which is subjected to the clipping from the inclination-corrected scan image AI (FIG. 4C).

Figure 5B:
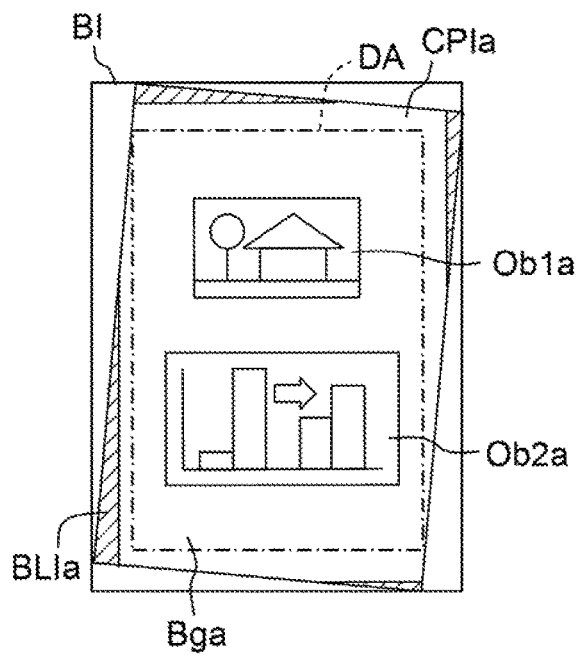

FIG. 5B depicts the background image BI. The background image BI is the image which is obtained by correcting the inclination by rotating the image by the angle θ after enlarging the scan image SI at the magnification Mr. That is, it is understood that when the enlarging process for performing the enlargement at the magnification Mr and the inclination correcting process for rotating the scan image after the enlargement by the angle θ are performed for the scan data, the background image data, which represents the background image BI, is generated. The background image BI includes the manuscript image including the enlarged background Bga and the enlarged objects Ob1a, Ob2a and the enlarged background image BLIa.

Figure 5C:
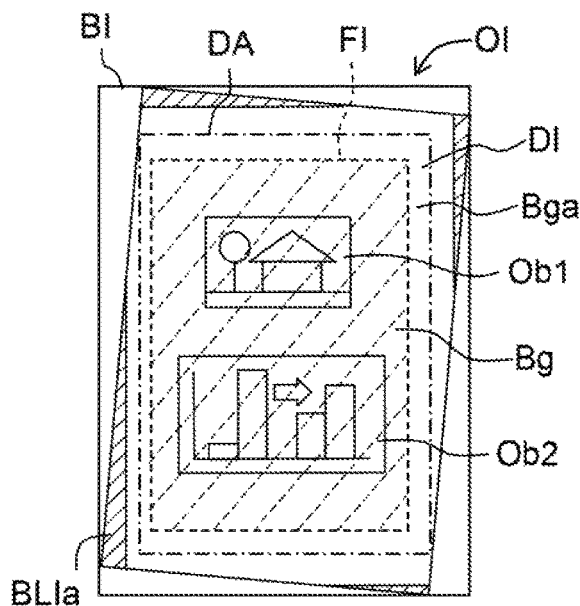

FIG. 5C depicts the overlay image (superimposed image) OI which is obtained by overlaying the foreground image FI on the background image BI. The reproduction image DI is the image (FIG. 5D) included in the reproduction area DA having the size corresponding to the size of the manuscript CP (for example, A4) of the overlay image OI depicted in FIG. 5C.

Figure 5D:
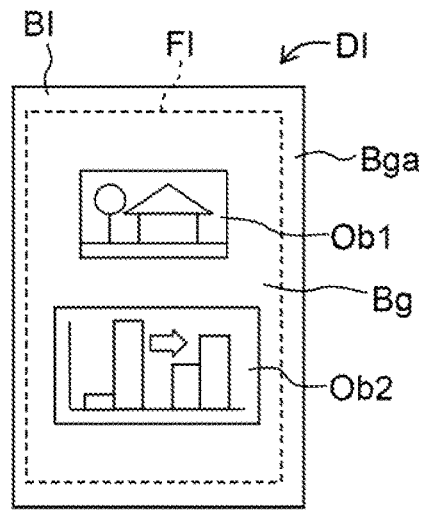

The reproduction image DI depicted in FIG. 5D includes the foreground image FI and the background Bga of the background image BI which is positioned at the portion disposed on the outer side of the foreground image FI. The reproduction image DI does not include the objects Ob1a, Ob2a of the background image BI and the blank space image BLIa.

In order to reproduce the reproduction image DI as described above, the image processing commands are generated, and the image processing commands are described in the buffer area 221. Specifically, as depicted in FIG. 3, a command group, which includes a foreground image generating command, a background image generating command, and a reproduction area designating command, is generated. The commands as described above are generated and described in accordance with the standard of PDF.

The foreground image generating command is the command which is provided to generate the foreground image data by using the scan data so that the foreground image FI is drawn on a specified coordinate system. The foreground image generating command includes a size designating command, an inclination correcting command, and a clip command. These commands are described so that the commands are executed in this order with respect to the scan data.

The size designating command is command which designates the size so that the size in the lateral direction of the image is "Lx" and the size in the vertical direction of the image is "Ly". Lx and Ly are the values which represent, for example, the image size corresponding to the size (for example, A4) of the manuscript CP.

The inclination correcting command is the command which rotates the image by the angle θ. The value, which is detected in S20, is used for the angle θ.

The clip command is the command which performs the clipping of the image in the rectangular area of the image in which the coordinates (X2, Y2) represent the lower-left apex, the length (width) in the lateral direction is W1, and the length (height) in the vertical direction is H1. X2, Y2, W1, H1 are set so that the foreground image FI, which is determined in S25, is clipped.

The background image generating command is the command which is provided to generate the background image data by using the scan data so that the background image BI is drawn on a specified coordinate system. The background image generating command includes a size designating command and an inclination correcting command. These commands are described so that the commands are executed in this order with respect to the scan data.

The size designating command includes a command which designates the size so that the size in the lateral direction of the image is "Lx" and the size in the vertical direction of the image is "Ly" in the same manner as the size designating command of the foreground image generating command, and a command which enlarges the image at a magnification E. Accordingly, the background image BI is provided as the image which has the magnification E provided that the magnification of the foreground image FI is used as a reference (1). The magnification E is set to the magnification Mr determined in S30.

The inclination correcting command is the command which rotates the image by the angle θ, in the same manner as the size designating command of the foreground image generating command. The value, which is detected in S20, is used for the angle θ.

As depicted in FIG. 3, the background image generating command is described formerly, and the foreground image generating command is described later. Thus, the background image BI is drawn, and then the foreground image FI is drawn on the background image BI. Accordingly, the overlay image OI, in which the foreground image FI is overlaid on the background image BI, is drawn on the specified coordinate system.

The reproduction area designating command is the command which designates the reproduction area DA included in the overlay image OI drawn on the specified coordinate system, the reproduction image DI being positioned in the reproduction area DA. Specifically, the rectangular area, which has the coordinates (X4, Y4) as the lower-left apex and which has the coordinates (X5, Y5) as the upper right apex, is designated as the reproduction area Da. The values of X4, Y4, X5, Y5 are set so that the area, which has the center of gravity that is the center of gravity GP of the foreground image FI and which has the size corresponding to the size of the manuscript CP (for example, A4), is designated as the reproduction area DA.

When the page data corresponding to the amount of 1 page, which includes the PEG data and the image processing commands, is generated, CPU 110 judges, in S45, whether or not the reading is completed for all of the manuscripts placed on the automatic manuscript transport unit.

If the manuscript, for which the reading is not completed, exists (S45: NO), then CPU 110 returns to S15, and the reading is performed for the next manuscript. If the reading is completed for all of the manuscripts (S45: YES), CPU 110 generates, in S50, the PDF footer which is recorded in the buffer area 121. As a result, the image file IF (FIG. 3) is completed in the buffer area 121. The PDF footer includes various types of data to follow the PDF standard including, for example, the cross reference table and the trailer.

The completed image file IF is transmitted, for example, to the computer 200, and the image file IF is subjected to the utilization by the user. In place thereof, the image file IF may be stored in the nonvolatile storage device 130 of the scanner 100.

CPU 210 of the computer 200 functions, for example, as a PDF viewer. Thus, it is possible to display the reproduction image DI on the display unit 260 by using the image file IF. In this procedure, CPU 210 executes the image processing on the basis of the image processing commands included in the image file IF with respect to the scan data included in the image file IF when the reproduction image DI is displayed on the display unit 260. Thus, the image data, which represents the reproduction image DI, is generated to display the reproduction image DI. For example, CPU 210 develops the compressed scan data (JPEG data) to acquire the scan data which is the bitmap data. Then, the image processing (for example, the inclination correcting process), which is based on the image processing command, is executed for the scan data. Thus, the values of the pixels of the scan data are corrected for each of the pixels to generate the corrected scan data. The scan data, which is obtained after executing all of the image processing commands, corresponds to the image data which represents the reproduction image DI.

Note that in place of the display, CPU 210 may allow a printer to print the reproduction image DI by using the image file IF. Also in this case, CPU 210 generates the image data which represents the reproduction image DI in the same manner as described above to print the reproduction image DI.

As depicted in FIG. 5D, the reproduction image DI appropriately depicts the manuscript CP depicted in FIG. 4A. For example, in the case of the scan image SI, the manuscript image CPI is inclined. Additionally, the blank space image BLI is included in the scan image SI. On this account, if the scan image SI depicted in FIG. 4B is reproduced as it is, the appearance is unsatisfactory. In the case of the reproduction image DI depicted in FIG. 5D, the inclination of the reproduction image FI which depicts the manuscript is corrected. Further, in the case of the reproduction image DI depicted in FIG. 5D, the background Bga of the background image BI is arranged outside the foreground image FI in place of the blank space image BLI. On this account, the appearance is improved in the reproduction image DI as compared with the scan image SI.

Figure 2:
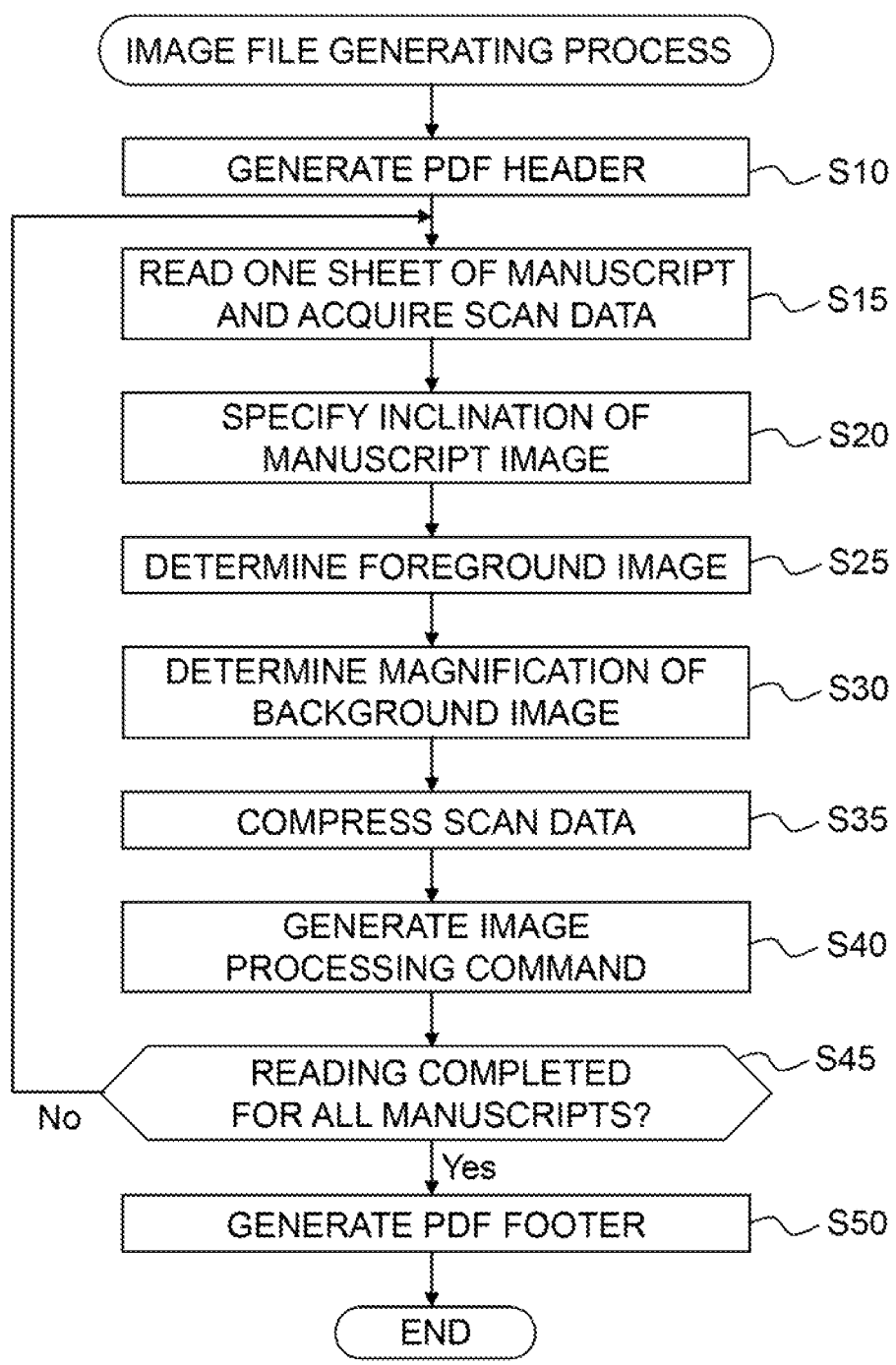
FIG. 2 depicts a now chart illustrating an image file generating process of a first embodiment.

In the first embodiment explained above, the result of the analysis process (S20 to S30 depicted in FIG. 2) for analyzing the scan data is used to generate the image processing command in which the image processing to be executed for the scan data is described (S40 depicted in FIG. 2). Then, the image file IF is generated, which includes the scan data and the image processing commands to be executed when the reproduction image DI is reproduced by the reproducing unit (for example, the display unit 260) by using the scan data. As a result, the scanner 100 can generate the image file which is provided to reproduce the image to be obtained by executing the image processing, without executing the image processing for the scan data obtained by reading the manuscript CP.

If CPU 110 executes the image processing (for example, the inclination correcting process) for the scan data which is the bitmap data to generate the already corrected image data so that the image file including the already corrected image data is generated, then an inconvenience hitherto arises such that the process time required to generate the image file is prolonged and/or an inconvenience hitherto arises such that the required resources, which include, for example, the buffer area 121 and CPU 110, are increased. In this embodiment, the image file IF, which includes the image processing commands, is generated without executing the image processing for the scan data. Therefore, it is possible to reduce the resources and the process time required to generate the image file IF.

Further, in the embodiment described above, CPU 110 executes the analysis process (S20 depicted in FIG. 21 for specifying the inclination from the specified direction (for example, the horizontal direction) of the manuscript image CPI to generate the image processing command including the command for rotating the scan image SI, i.e., the inclination correcting command for correcting the inclination of the manuscript image CPIa (S40 depicted in FIG. 2, FIG. 3). As a result, it is possible to generate the image file IF in order to reproduce the reproduction image DI (FIG. 5D) in which the inclination has been already corrected by using the scan data.

Further in the embodiment described above, CPU 110 generates the image processing command (FIGS. 3 to 5) so as to reproduce the reproduction image DI which includes the foreground image FI as a part of the manuscript image CPI included in the scan image AI having the already corrected inclination and which does not include the blank space image BLI positioned outside the manuscript image CPI. That is, CPU 110 generates the image processing command including the command which is provided in order that the foreground image FI is reproduced and the blank space image BLI is not reproduced. As a result, it is possible to generate the image file IF which is provided in order that a part of the manuscript image CPI is reproduced and the blank space image BLI is not reproduced. Further, is possible to reduce the resources and the process time required to generate the image file IF as described above.

Further, the image processing command includes the commands for reproducing the foreground image FI and the background image SI to be displayed in place of the blank space image BLI, specifically, the foreground image generating command and the background image generating command (FIG. 3). As a result, it is possible to generate the image file IF which makes it possible to appropriately realize the exclusion of the reproduction of the blank space image BLI. In general, it is assumed that the background Bg is positioned and the objects Ob1, Ob2 are not positioned at the outer edge portion of the manuscript CP. Therefore, the background Bga of the background image BI is arranged in place of the blank space image BLI at the end portion of the reproduction image DI by overlaying the foreground image FI on the background image BI obtained by enlarging the scan image SI.

More specifically, the image processing command includes the foreground image generating command for generating the foreground image data which represents the foreground image FI by using the scan data and the background image generating command for generating the background image data which represents the background image BI by using the scan, data, and the image processing command further includes the command for displaying the foreground image FI and the background image BI in the overlay manner. Then, the background image BI is the image which represents the manuscript image CPI, and the background image BI is the image which is generated at the magnification Mr larger than that of the foreground image FI (FIG. 5B). As a result, it is possible to easily generate the image file IF which makes it possible to more appropriately realize the exclusion of the reproduction of the blank space image BLI.

Further, in the foregoing embodiment, as described above, the magnification Mr of the background image BI is dynamically determined depending on the blank space image BLI (S25, S30 depicted in FIG. 2). That is, it is possible to remark that CPU 110 determines the magnification Mr of the background image BI with respect to the foreground image FI to have different values depending on the blank space image, by analyzing the objective image data. As a result, the magnification Mr is determined to have the appropriate value. Therefore, it is possible to generate the image file IF which makes it possible to more appropriately realize the exclusion of the display of the blank space image BLI.

Further, the analysis process (S20 to S30) of the foregoing embodiment includes the process to detect the edge included in the scan image SI. As a result, it is possible to easily analyze the feature of the scan image SI. For example, it is possible to appropriately analyze the angle θ of the inclination of the manuscript image CPI included in the scan image SI. Further, it is possible to appropriately set the foreground image FI for the manuscript image CPI.

As understood from the foregoing explanation, the foreground image FI of this embodiment is an example of the first image, and the background image BI is an example of the second image. Further, the foreground image generating command, the background image generating command, and the reproduction area designating command of this embodiment are examples of the reproduction control command.

Second Embodiment

Figure 6:
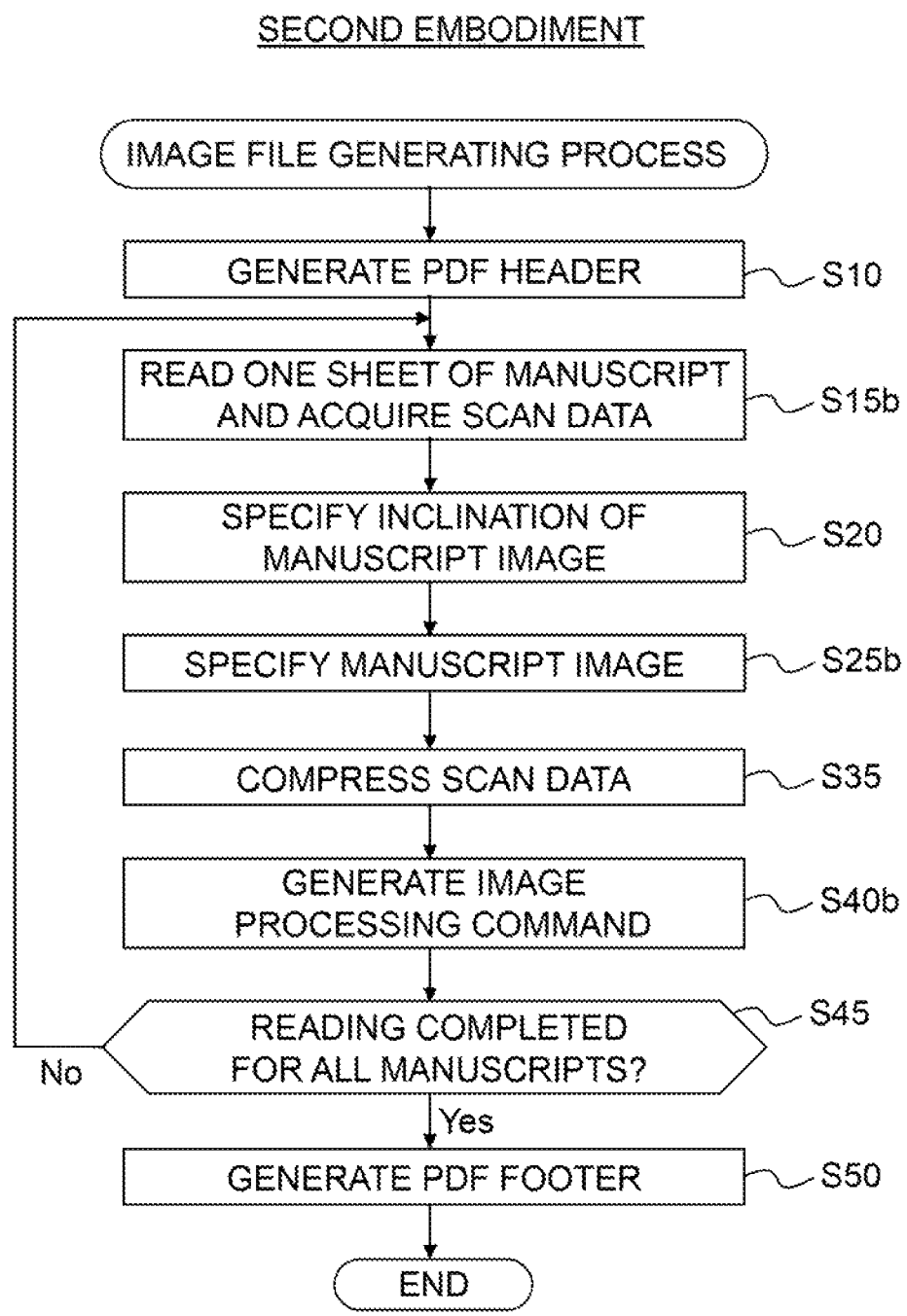
FIG. 6 depicts a flow chart illustrating an image file generating process of a second embodiment.

In a second embodiment in the image file generating process depicted in FIG. 6, the process of S15b is performed in place of S15 depicted in FIG. 2, the process of S25b is performed in place of S25 and S30 depicted in FIG. 2, and the process of S40b is performed in place of S40 depicted in FIG. 2. The other processes of the image file generating process depicted in FIG. 6 are the same as those of the image file generating process depicted in FIG. 2, any explanation of which will be omitted.

Figure 8A:
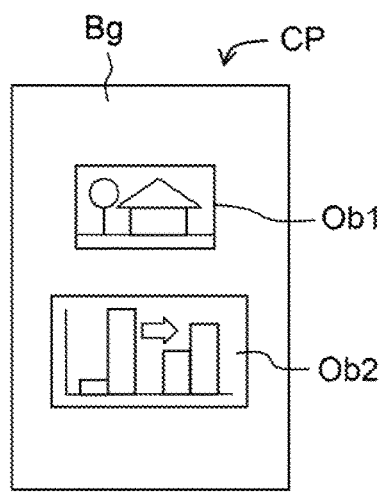
FIGS. 8A to 8D depict examples of a manuscript and an image of the second embodiment.
Figure 8B:
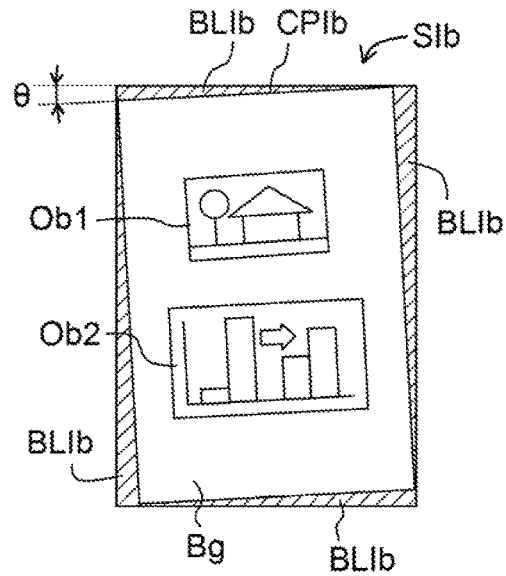

In S15b, CPU 110 controls the reading execution unit 150 to generate the scan data which represents the scan image by optically reading one sheet of the manuscript of one or more sheets of the manuscript placed in the automatic manuscript transport unit. Accordingly, CPU 110 acquires the scan data corresponding to one sheet of the manuscript. In this procedure, unlike the first embodiment, CPU 110 automatically detects the size of the manuscript CP to generate the scan image which represents the scan image SIb in the area corresponding to the circumscribing rectangle that circumscribes the manuscript CP. Therefore, as depicted in FIG. 8B, the scan image SIb is the image which has the shape and the size of the circumscribing rectangle that circumscribes the manuscript image CPIb to represent the entire manuscript CP. Then, the scan image SIb includes a manuscript image CPIb) which represents the entire manuscript CP and a blank space image BLIb which is positioned outside the manuscript image CPIb.

In S25b CPU 110 executes the process for specifying the manuscript image CPIb included in the scan image SIb. Specifically, CPU 110 specifies the manuscript image CPIb by detecting the edge included in the scan image SIb.

In S40b, CPU 110 generates the image processing command by using the result of the analysis process of S20 and S25b, wherein the image processing command, which is to be executed for the scan data when the reproduction image DIb is reproduced by using the image file IFb, is described in the image processing command.

Figure 8C:
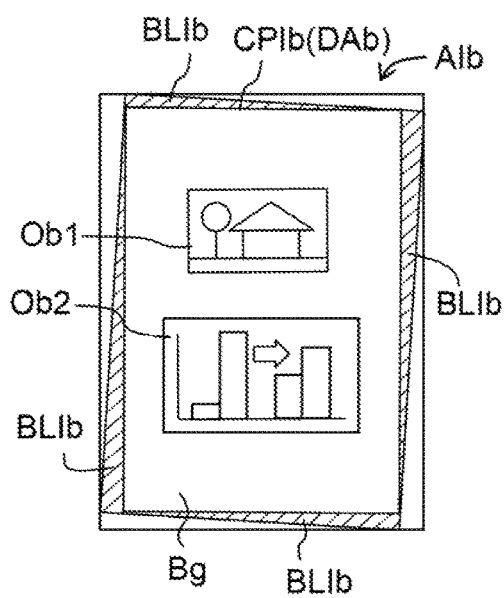

An explanation will now be formerly made about the reproduction image DIb to be reproduced by using the image file IFb. FIG. 8C depicts the inclination-corrected scan image AIb which is obtained by rotating the scan image SIb (FIG. 8B) by the angle θ. The reproduction image DIb of the second embodiment is the already specified manuscript image CPIb (FIG. 8D) which is included in the inclination-corrected scan image AIb depicted in FIG. 8C. That is, the reproduction image DIb includes only the manuscript image CPIb, and the reproduction image DIb does not include the blank space image BLIb.

Figure 8D:
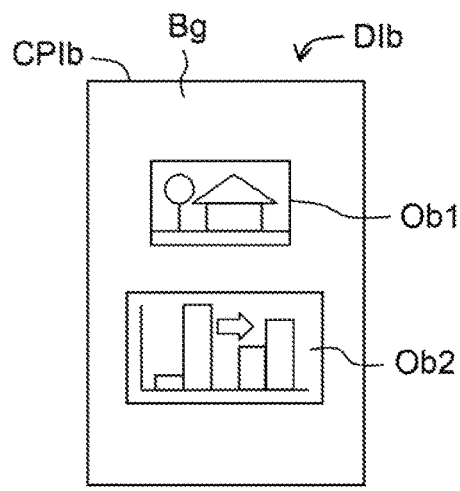

As depicted in FIG. 8D, the reproduction image DIb appropriately represents the manuscript CP in the same manner as the reproduction image DI depicted in FIG. 5D. That is, the inclination of the manuscript image CPIb is corrected in the reproduction image DIb. Further, the reproduction image DIb does not include the blank space image BLIb.

As understood from the foregoing explanation, the image data, which represents the inclination-corrected scan image AIb, can be generated by performing the inclination correcting process for the scan data, the scan image SI being rotated by the angle θ in the inclination correcting process. Then, the area, which is included in the inclination-corrected scan image AIb and which is arranged with the already specified manuscript image CPIb, is set to the reproduction area DIb, and thus it is possible to reproduce the reproduction image DIb.

Figure 7:
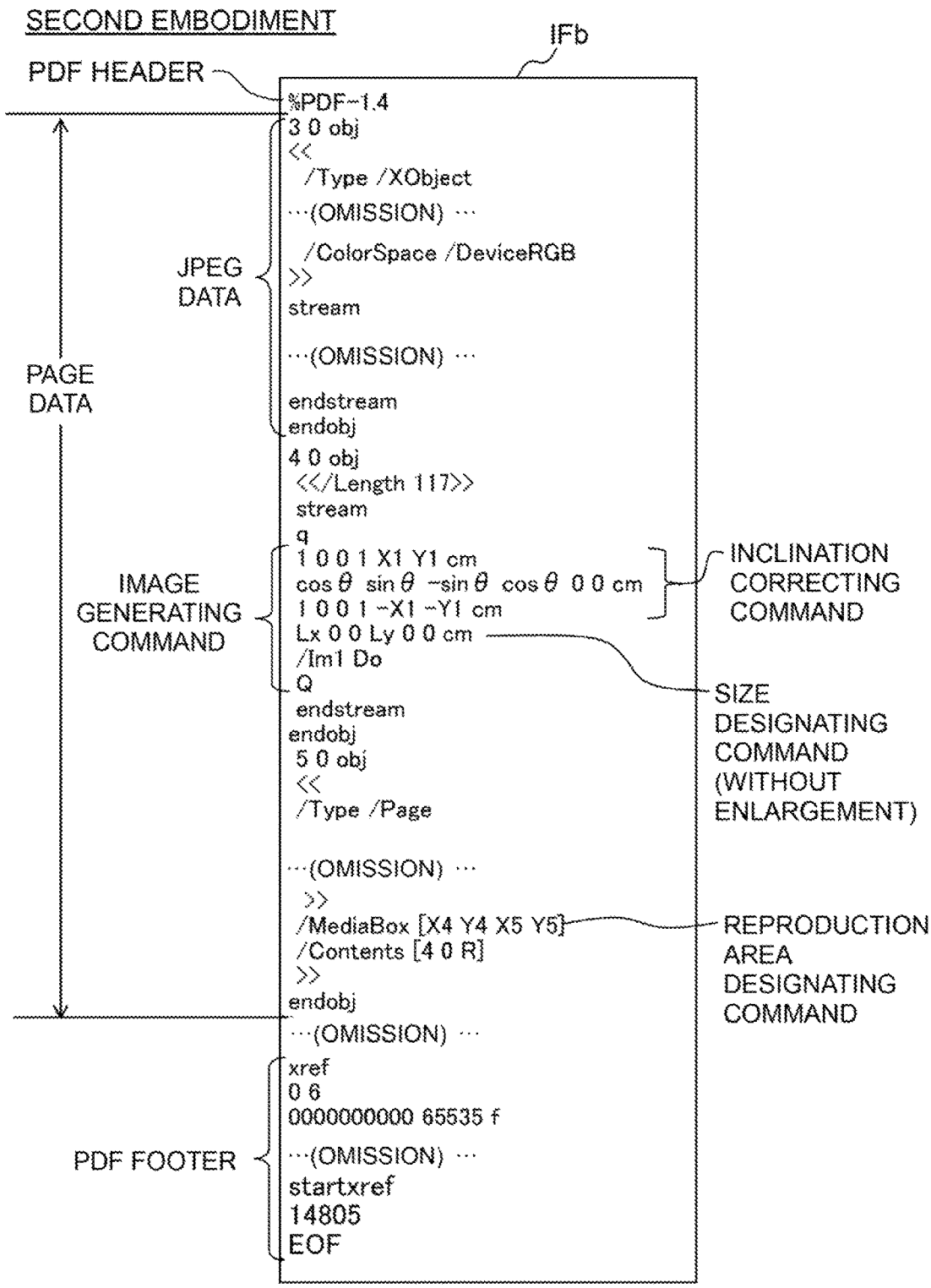
FIG. 7 depicts an example of an image file of the second embodiment.

In S40b in order to reproduce the reproduction image DIb as described above, the image processing command is generated, which is described in the buffer area 221. Specifically, as depicted in FIG. 7, a command group, which includes an image generating command and a reproduction area designating command, is generated and described in accordance with the standard of PDF.

The image generating command is the command which is provided to generate the image data that represents the inclination-corrected scan image AIb by using the scan data so that the inclination-corrected scan image AIb is drawn on a specified coordinate system. The image generating command includes a size designating command and an inclination correcting command. These commands are described so that the commands are executed in this order with respect to the scan data.

The size designating command and the inclination correcting command are the commands which are the same as or equivalent to the size designating command and the inclination correcting command included in the foreground image generating command depicted in FIG. 3.

The reproduction area designating command is the command for designating the reproduction area DAb included in the image drawn on the specified coordinate system in which the reproduction image DIb is positioned. Specifically, the rectangular area, in which the coordinates (X4, Y4) represent the lower-left apex and the coordinates (X5, Y5) represent the upper-right apex, is designated as the reproduction area DAb. The values of X4, Y4, X5, Y5 are set so that the area, in which the manuscript image CPU specified in S25B is positioned, is designated as the reproduction area DAb on the inclination-corrected scan image AIb.

As understood from the foregoing explanation, in the second embodiment, CPU 110 executes the analysis process (S25b depicted in FIG. 6) for specifying the manuscript image CPIb) included in the scan image SIb. Then, the command, which is generated in S40b depicted in FIG. 6, includes the command which allows the already specified manuscript image CPIb to be included in the reproduction image DIb and which allows the image in the area different from the already specified manuscript image CPIb) to be regarded as the blank space image BLIb and excluded from the reproduction image DIb. As a result, it is possible to appropriately generate the image file IFb in order that the manuscript image CPIb is reproduced and the blank space image BLIb is not reproduced.

As understood from the foregoing explanation the image generating command and the reproduction area designating command of this embodiment are examples of the reproduction control command.

Third Embodiment

In a third embodiment, in the image file generating process depicted in FIG. 9, the processes of S20c and S25c are performed in place of S20 to S30 depicted in FIG. 2, and the process of S40c is performed in place of S40 depicted in FIG. 2. The other processes of the image file generating process depicted in FIG. 9 are the same as those of the image file generating process depicted in FIG. 2, an explanation of which will be omitted.

Figure 11A:
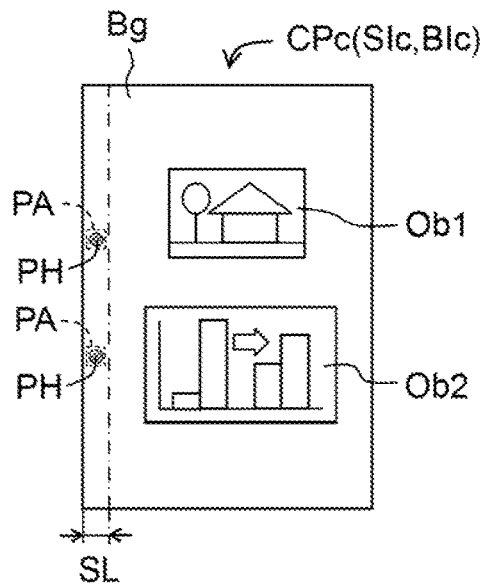
FIGS. 11A to 11D depict examples of a manuscript and an image of the third embodiment.

FIG. 11A depicts an example of the manuscript CPc to be read in S15. The manuscript CPc is formed with a plurality of punch holes PH to be used when the manuscript CPc is bound in a sheet file. The other construction of the manuscript CPc is the same as that of the manuscript CP depicted in FIG. 4A.

In this case, in order to avoid any complicated explanation, it is assumed that the scan image SIc, which is represented by the scan data generated in S15, has no inclination, and the scan image SIc includes no blank space image. It is also possible to say that FIG. 11A depicts the scan image SIc. The scan image SIc includes the images PA which represent the punch holes PH together with the background Bg and the objects Ob1, Ob2.

In S20c, CPU 110 specifies the images PA which represent the punch holes PH included in the scan image SIc, as a part of the analysis process for the scan data. The punch holes PH are circles each of which generally has a constant size, and the punch holes PH are arranged along the outer edge of the manuscript CPc. Further, the color of the inside of the punch hole PH is the color of the manuscript stand disposed at the position opposed to the image sensor of the scanner 100. CPU 110 performs the pattern matching along the outer edge of the manuscript CPc to search for the portions each having the shape, the size, and the color thereof. Thus, the image PA having the punch hole PH is specified. Alternatively, the following procedure is also available. That is, the edge, which represents the boundary between the image that represents the manuscript CPc and the image that represents the punch hole PH, is detected. The image PA, which represents the punch hole PH, is specified on the basis of the position and the shape of the detected edge.

In S25c, CPU 110 determines the direction and the amount SL for shifting the background image BIc described later on, as a part of the analysis process for the scan data. The direction, in which the background image BIc is shifted, is determined to be the direction of the end at which the images PA that represent the plurality of punch holes PH are positioned in the scan image SIc, the direction being any one of the left, right, upward, and downward directions. In the case of the example depicted in FIG. 11A, the images PA, which represent the plurality of punch holes PH, are positioned at the left end of the scan image SIc. Therefore, the direction, in which the background image BIc is shifted, is determined to be the leftward direction. The amount SL for shifting the background image BIc is determined, for example, to be the length ranging from the end which is included in the upper, lower, left and right ends of the images PA that represent the plurality of punch holes PH and which is disposed in the direction opposite to the direction for shifting the background image BIc to the end which is included in the upper, lower, left, and right ends of the scan image SIc and which is disposed in the direction for shifting the background image BIc. In the case of the example depicted in FIG. 11A, the amount SL, for shifting the background image BIc is determined to be the length ranging from the right end of the images PA that represent the plurality of punch holes PH to the left end of the scan image SIc.

In S40c, CPU 110 generates the image processing command in which the image processing to be executed for the scan data when the reproduction image DIc is reproduced by using the image file IFc is described, by using the result of the analysis process of S20c and S25c.

Figure 11B:
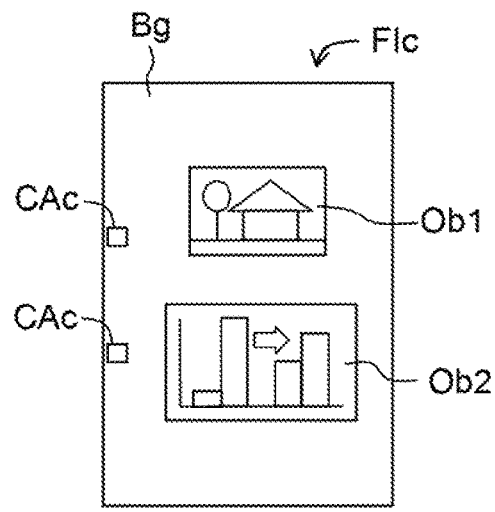

An explanation will now be formerly made about the reproduction image DIc to be reproduced by using the image file IFc. FIG. 11B depicts the foreground image FIc. The foreground image FIc is the image obtained by clipping the image from which the images PA that represent the plurality of punch holes PH are excluded, from the scan image SIc. That is, the foreground image FIc is the image in which the images PA that represent the plurality of punch holes PH are deleted from the scan image SIc. In FIG. 11B, the area CAc is the area which corresponds to the deleted image PA. It is understood that when the clip process, in which the image except for the images PA that represent the plurality of punch holes PH is clipped from the scan image SIc, is performed for the scan data, the foreground image data, which represents the foreground image FI, is generated.

The background image BIc is the image which is the scan image SIc as it is. It is also possible to say that FIG. 11A depicts the background image BIc.

Figure 11C:
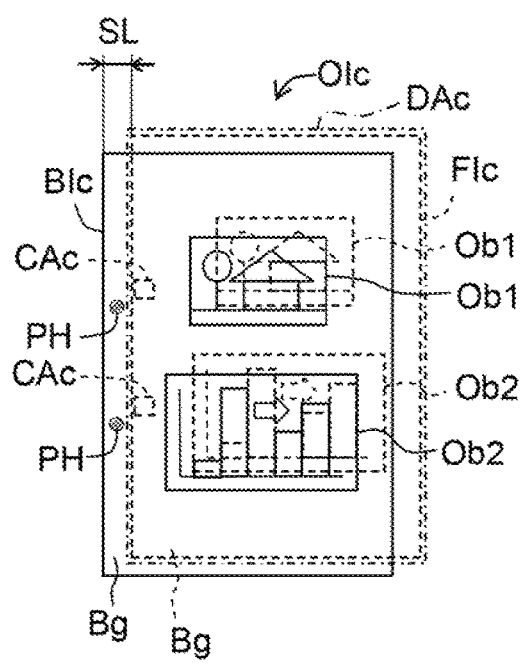

FIG. 11C depicts the overlay image OIc which is obtained by overlaying the foreground image FIc on the background image BIc. In this case, the background image BIc and the foreground image FIc are subjected to the overlay in a state in which the background image BIc is deviated with respect to the foreground image FIc. The direction and the amount of the deviation of the background image BIc with respect to the foreground image FIc are the direction and the amount determined in S250. In the example depicted in FIG. 11C, the background image BIc is deviated by the amount SL in the leftward direction with respect to the foreground image FIc.

Figure 11D:
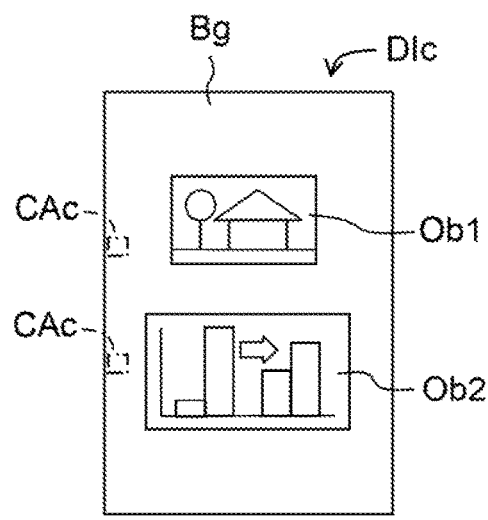

The reproduction image DIc is the image (FIG. 11D) which is included in the reproduction area DAc corresponding to the entire foreground image FIc, of the overlay image OIc depicted in FIG. 11C.

The reproduction image DIc includes the whole of the foreground image FI. Then, the background Bg of the background image BIc is reproduced in the area CAc of the foreground image FI in the reproduction image DIc. Therefore, the reproduction image DIc includes the image of the scan image SIc from which the images PA that represent the plurality of punch holes PH are excluded, and the reproduction image DIc does not include the images PA that represent the plurality of punch holes PH.

Figure 10:
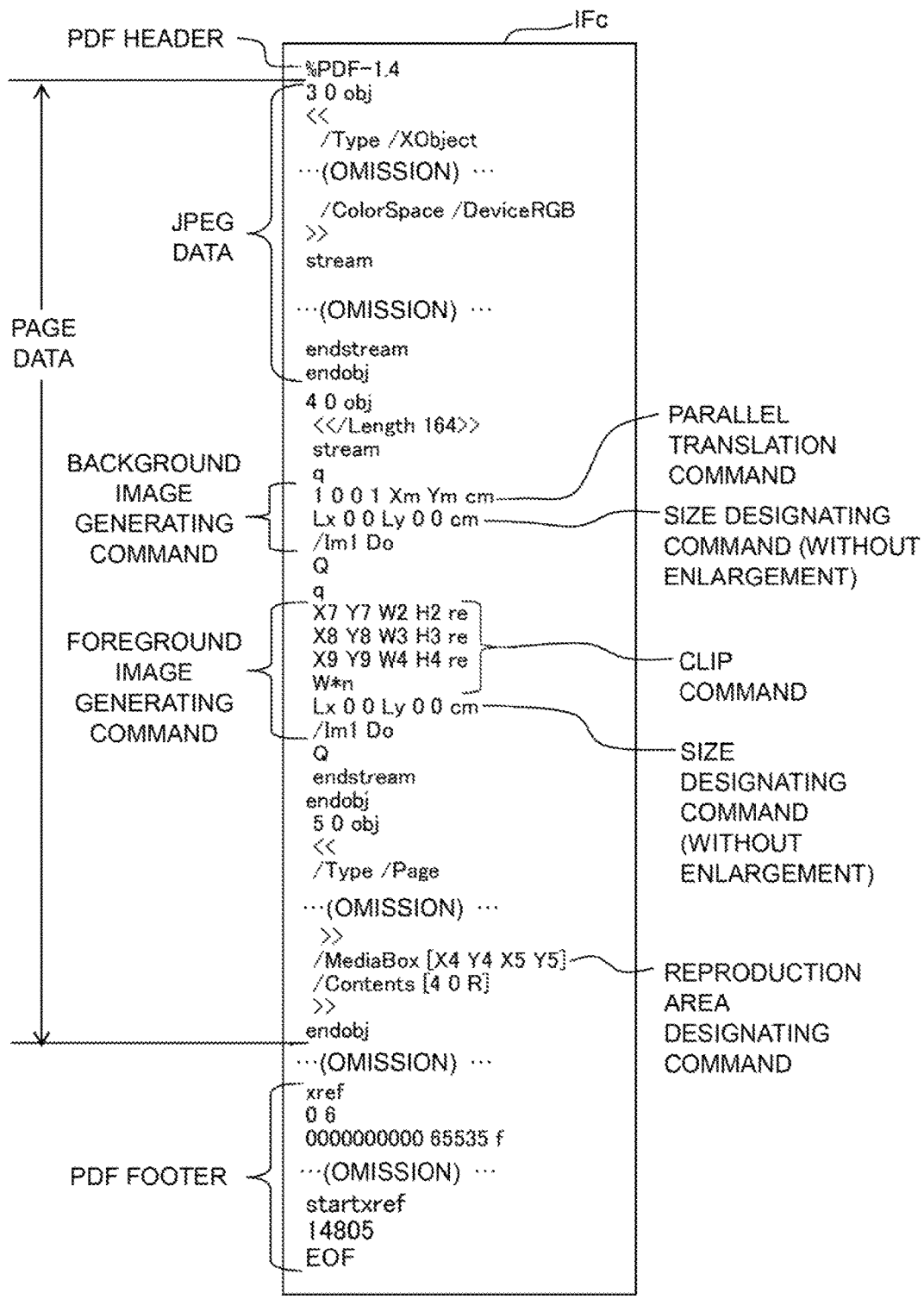
FIG. 10 depicts an example of an image file of the third embodiment.

In S40c, in order to reproduce the reproduction image DIc as described above, the image processing commands are generated, and the image processing commands are described in the buffer area 221. Specifically, as depicted in FIG. 10, a command group, which includes a foreground image generating command, a background image generating command, and a reproduction area designating command, is generated. These commands are generated and described in accordance with the standard of PDF.

The foreground image generating command is the command which is provided to generate the foreground image data by using the scan data so that the foreground image FIc is drawn on a specified coordinate system. The foreground image generating command includes a size designating command and the clip command, and the foreground image generating command is described so that these commands are executed in this order for the scan data.

The size designating command is the same as the size designating command which is included in the foreground image generating command depicted in FIG. 3.

The clip command is the command which is provided to clip the image in which the images PA that represent the plurality of punch holes PH are excluded, from the scan image SIc. For example, "X7 Y7 W2 H2" is set so that the rectangular, area, which corresponds to the entire scan image SIc, is prescribed. "X8 Y8 W3 H3" and "X9 Y9 W3 H3" are set so that the rectangular areas, which correspond to the images PA that represent the two punch holes PH in FIG. 11A, are prescribed.

The background image generating command is the command which is provided to generate the background image data by using the scan data so that the background image BIc is drawn on a specified coordinate system. The background image generating command includes a size designating command and a parallel translation command, and the background image generating command is described so that these commands are executed in this order with respect to the scan data.

The size designating command is the same as the size designating command of the foreground image venerating command. That is, in this embodiment, the foreground image FIc and the background image BIc has the same magnification.

The parallel translation command is the command which is provided to cause the parallel translation of the image by "Xm" in the X direction (lateral direction as viewed in FIG. 11) and cause the parallel translation by "Ym" in the Y direction (vertical direction as viewed in FIG. 11). The values of Xm, Ym are set on the basis of the direction and the distance SL for shifting the background image BIc as determined in S25c. In the example depicted in FIG. 11A, the setting is made to "Xm=−SL, Ym=0" so that the background image BIc is subjected to the parallel translation by the distance SL in the leftward direction.

As depicted in FIG. 10, the background image generating command is described formerly, and the foreground image generating command is described later. Accordingly, the foreground image FIc is drawn on the background image BIc after the background image BIc is drawn, in the same manner as in the first embodiment. Accordingly, the overlay image OIc in which the foreground image FIc is overlaid on the background image BIc, is drawn on the specified coordinate system.

The reproduction area designating command is the command for designating the reproduction area DAc at which the reproduction image DIc is positioned, of the overlay image OIc drawn on the specified coordinate system, in the same manner as the reproduction area designating command depicted in FIG. 3. The values of X4, Y4, X5, Y5 are set so that the rectangular area of the overlay image OIc, which corresponds to the entire foreground image FIc, is designated as the reproduction area DAc.

As understood from the foregoing explanation, in the third embodiment, CPU 110 executes the analysis process for specifying the images PA which represent the punch holes PH of the manuscript CPc included in the scan image SIc (20c depicted in FIG. 9). Then, CPU 110 generates the image processing command including such commands that the images, which represent the portions different from the punch holes PH in the scan image SIc (specifically, the images including the background Bg and the objects Ob1, Ob2), are included in the reproduction image DIc, and the images PA, which represent the already specified punch holes PH, are excluded from the reproduction image DIc (S40c depicted in FIG. 9). As a result, it is possible to generate the image file IFc which is provided in order that the images, which represent the portions different from the punch holes PH, are reproduced, and the images PA, which represent the punch holes PH, are not reproduced.

Further, in the third embodiment, CPU 110 generates the image processing command which is provided to reproduce the reproduction image DIc (FIG. 11D) including the image that represents the background Bg of the background image BIc in place of the image PA that represents the punch hole PH (S40c depicted in FIG. 9). Accordingly, the image, which represents the background Bg of the background image BIc, is reproduced in place of the punch hole PH of the manuscript CPc. Therefore, it is possible to improve the appearance of the reproduction image DIc. In general, it is assumed that the background Bg is positioned except for the punch holes PH and the objects Ob1, Ob2 are not positioned at the outer edge portion of the manuscript CPc. Therefore, the foreground image FI is overlaid on the background image BI while being deviated by the slight amount SL, and thus the background Bga of the background image BI is arranged at the end portion of the reproduction image DI in place of the punch holes PH.

As understood from the foregoing explanation, the image, which represents the background Bg of the background image BIc of this embodiment, is an example of the supplementary image. Further, the punch hole PH of this embodiment is an example of the specified portion of the manuscript, the image PA, which represents the punch hole PH, is an example of the third image, and the image included in the scan image SIc, from which the images PA that represent the punch holes PH are excluded, is an example of the fourth image.

Modified Embodiment

The image file generating process depicted in FIG. 2 is entirely executed by CPU 110 of the scanner 100. The present teaching is not limited thereto. It is also allowable that the image file generating process entirely or partially executed by any other apparatus.

For example, CPU 210 of the computer 200 depicted in FIG. 1 executed all of the image file generating process depicted in FIG. 2. In this case, for example, CPU 210, which functions as a scan driver by executing the scanner driver program PG2, executes the image file generating process. Then, in S15 depicted in FIG. 2, the following procedure is available. That is, the scan driver controls the scanner 100, and thus the scanner 100 as the reading execution unit is allowed to generate the scan data so that the scan data is acquired from the scanner 100. In this case, the computer 200 corresponds to the image processing apparatus. The same or equivalent procedure is also available for the image file generating processes depicted in FIGS. 6 and 9.

In this case, the scan data is compressed into the JPEG format by means of CPU 110 of the scanner 100. The computer 200 may acquire the compressed scan data (specifically the JPEG data) from the scanner 100. In this case, CPU 210 of the computer 200 develops the already compressed scan data to execute the analysis process (S20 to S30) in which the already developed scan data (bitmap data such as the RGB image data or the like) is analyzed. Then, CPU 210 of the computer 200 may generate the image file IF by using the already compressed scan data acquired from the scanner 100 as it is, without executing the compression of the scan data in S35.

Further, in another embodiment, CPU 110 of the scanner 100 and CPU 210 of the computer 200 may cooperate to execute the image file generating process depicted in FIG. 2. For example, CPU 110 of the scanner 100 executes the processes up to S15 to S35 depicted in FIG. 2, i.e., the acquisition of the scan data (S15), the analysis process for the scan data (S20 to S30), and the compression of the scan data (S35). Then, CPU 110 transmits the analysis result of the scan data and the already compressed scan data to the computer 200. When the computer 200 receives the analysis result of the scan data and the already compressed scan data, CPU 110 of the computer 200 executes the generation of the image processing command in S40 depicted in FIG. 2 to generate the image file IF. In this case, the whole of the scanner 100 and the computer 200 corresponds to the image processing apparatus. The same or equivalent procedure also holds for the image file generating processes depicted in FIGS. 6 and 9.

In the image file generating process depicted in FIG. 2, CPU 110 completes the image file IF in the buffer area 121. In place thereof, CPU 110 may transmit the PDF header generated in S10 depicted in FIG. 2, the already compressed scan data generated in S35 depicted in FIG. 2, the image processing command generated in S40 depicted in FIG. 2, and the PDF footer generated in S50 depicted in FIG. 2 to the computer 200 every time when they are generated. In this case, the image file IF is completed in the computer 200 which receives them. In this case, for example, even when the capacity of the buffer area of the scanner 100 is small, it is possible to generate the file IF having a large size, for example, the image file IF having a relatively large number of pages. The same or equivalent procedure also holds for the image file generating process depicted in FIG. 9.

In the image file generating process depicted in FIG. 2, CPU 110 compresses the scan data in S35 after the analysis process for the scan data in S20 to S30. In place thereof, CPU 110 may concurrently execute the analysis process for the scan data in S20 to S30 and the compression of the scan data in S35. For example, the compression of the scan data may be executed for every partial data in a predetermined amount, while performing the analysis process for the scan data stored in the buffer area 121, and the already compressed partial data may be transmitted to the computer 200. In this way, even when the analysts process for the scan data is not terminated, CPU 110 can successively transmit the already compressed scan data to the computer 200 from the point in time provided immediately after the generation of the scan data.

The background Bga of the background image BI is arranged in the area disposed outside the foreground image FI in the reproduction image DI (FIG. 5D) in the image file generating process depicted in FIG. 2. In place thereof, any other image may be arranged in the area disposed outside the foreground image FI. For example, a partial image, which represents the background Bg of the scan image SI generated by clipping the end portion of the scan image SI, may be arranged in the area disposed outside the foreground image FI. In this case, for example, in S40, the image processing command, which includes, a clip command for clipping the end portion of the scan image SI and a command for arranging the clipped image at the position disposed outside the foreground image FI, may be generated.

In the reproduction image DIc (FIG. 11D) in relation to the image file generating process depicted in FIG. 9, the background Bg of the background image BIc is arranged in the area CAc corresponding to the punch hole PH of the foreground image FIc. In place thereof, any other image may be arranged in the area CAc of the foreground image FIc. For example, a partial image, which represents the background Bg of the scan image SIc generated by clipping the end portion of the scan image SIc, may be arranged in the area CAc of the foreground image FIc. In this case, for example, it is appropriate to generate, in S40C, the image processing command which includes a clip command for clipping portion of the scan image SIc and a command for arranging the clipped image in the area CAc of the foreground image FIc.

In the image file generating process depicted in FIG. 9, it is also allowable that the area included in the scan image SIc depicted in FIG. 11A, from which the band-shaped end area having the width SL including the images PA corresponding to the punch holes PH is excluded, is designated as the reproduction area. In this case, the reproduction image has a slender shape on account of the fact that the band-shaped end area is excluded. However, it is possible to realize such a situation that the image, which represents the portion different from the punch holes PH, is reproduced, and the images PA, which represent the punch holes PH, are not reproduced, without overlaying the background image BI and the foreground image FI. As a result, it is possible to easily generate the image file.

In the image file generating process depicted in FIG. 2, the range of the foreground image FI is dynamically determined in S25, and the magnification Mr of the background image BI is dynamically determined in S30. However, it is also allowable that the range of the foreground image FI and the magnification Mr of the background image BI are previously determined.

The image file IF, which is generated in the image generating process depicted in FIGS. 2, 6, and 9, is the PDF file. However, in place thereof, it is also allowable to generate an image file which is written, for example, in any other page writing language such as the XPS (XML Paper Specification) format or the like.

The image file generating process depicted in FIG. 2 is described by way of example, which may be appropriately modified. For example, the processes of S24, S30 depicted in FIG. 2 may be omitted, and only the specification of the inclination of the manuscript image CPI (S20) may be executed. Then, in S40, it is also allowable to generate only the inclination correcting command for correcting the inclination of the manuscript image CPI. In this case, the reproduction image DI is such an image that the inclination is corrected but the blank space image BLI is included. Further, S35 may be omitted, and the uncompressed scan data may be stored as it is in the image file IF.

In the image file generating process depicted in FIG. 9, the image PA, which represents the punch hole PH of the manuscript. CPc, is not included in the reproduction image DIc, and the image, which represents the portion different from the punch hole PH of the manuscript CPc, is included. In place thereof, it is also allowable that an image, which represents the header portion and the footer portion of the manuscript, is not included in the reproduction image, and an image, which represents the central portion between the header portion and the footer portion, is included therein. That is, in general, it is preferable that an image, which represents a specified portion of the manuscript, is included in the reproduction image, and a portion, which is different from the specified portion of the manuscript, is not included therein.

In each of the embodiments described above, it is also allowable that the construction realized by the hardware is partially replaced with any software. On the contrary, it is also allowable that the construction realized by the software is partially replaced with any hardware.

The present teaching has been explained above on the basis of the embodiments and the modified embodiments. However, the foregoing embodiments of the teaching are provided in order to easily understand the present teaching, which do not limit the present teaching. The present teaching may be changed and improved without deviating from the gist or essential characteristics thereof as well as from claims. Further, any equivalent thereof is included in the present teaching.

What is claimed is:

1. An image processing apparatus comprising:
   a controller configured to perform:
   acquiring objective image data representing an objective image, the objective image data being obtained by optically reading a manuscript;
   analyzing the objective image data;

generating an image processing command in which image processing to be executed for the objective image data is described, by using a result of analysis of the objective image data; and generating an image file including the objective image data and the image processing command, wherein an image represented by the objective image data included in the generated image file is the same as the objective image represented by the objective image data obtained by optically reading the manuscript, wherein the image processing command is to be executed when a reproduction image is reproduced at a reproduction unit by using the image file, and wherein the reproduction image is different from the objective image represented by the objective image data obtained by optically reading the manuscript.

2. The image processing apparatus according to claim 1, wherein the objective image includes a manuscript image representing the manuscript, the controller is further configured to perform specifying an inclination of the manuscript image with respect to a predetermined direction by using the objective image data, and the image processing command includes an inclination correcting command that causes the reproduction unit to correct the inclination of the manuscript image with respect to the predetermined direction by rotating the objective image.

3. The image processing apparatus according to claim 2, wherein the objective image further includes a blank space image positioned outside the manuscript image, and the image processing command includes a reproduction control command that causes the reproduction unit to reproduce at least a part of the manuscript image and not to reproduce the blank space image, after correcting the inclination of the manuscript image with respect to the predetermined direction.

4. The image processing apparatus according to claim 3, wherein the reproduction control command causes the reproduction unit to reproduce a first image which is the at least a part of the manuscript image and a second image which is to be reproduced in place of the blank space image.

5. The image processing apparatus according to claim 4, wherein the reproduction control command causes the reproduction unit to:

generate first image data representing the first image and second image data representing the second image by using the objective image data; and display the first image and the second image in an overlapped manner, and the second image is at least another part of the manuscript image to be generated at a magnification which is larger than that of the first image.

6. The image processing apparatus according to claim 5, wherein the controller is further configured to perform determining the magnification of the second image with respect to the first image depending on the blank space image, by analyzing the objective image data.

7. The image processing apparatus according to claim 3, wherein the controller is further configured to perform specifying the manuscript image included in the objective image, and the reproduction control command causes the reproduction unit to:

include the manuscript image in the reproduction image; and exclude an image, which is included in the objective image and different from the manuscript image, from the reproduction image, as the blank space image.

8. The image processing apparatus according to claim 1, wherein the objective image includes a third image representing a specified portion of the manuscript and a fourth image representing another portion of the manuscript different from the specified portion, the controller is further configured to perform specifying the third image, and the image processing command causes the reproduction unit to:

include the fourth image in the reproduction image; and exclude the third image from the reproduction image.

9. The image processing apparatus according to claim 8, wherein the image processing command causes the reproduction unit to reproduce the reproduction image including a supplementary image in place of the third image.

10. The image processing apparatus according to claim 1, wherein the controller is configured to detect an edge included in the objective image.

11. A non-transitory computer-readable medium storing a computer-executable program that, when executed by a processor, causes a computer to:

acquire objective image data representing an objective image, the objective image data being obtained by optically reading a manuscript;

analyze the objective image data;

generate an image processing command in which image processing to be executed to the objective image data is described, by using a result of analysis of the objective image data, the image processing command being executed when an output image is outputted to an output unit by using the objective image data; and generate an image file including the objective image data and the image processing command, wherein an image represented by the objective image data included in the generated image file is the same as the objective image represented by the objective image data obtained by optically reading the manuscript and the output image is different from the objective image represented by the objective image data obtained by optically reading the manuscript.

12. An image processing apparatus comprising:

a controller configured to perform:

acquiring objective image data representing an objective image, the objective image data being obtained by optically reading a manuscript;

analyzing the objective image data;

generating an inclination correction command in which an inclination correction to be executed for the objective image data is described by using a result of analysis of the objective image data; and generating an image file including the objective image data and the inclination correction command, wherein an inclination of an image represented by the objective image data included in the generated image file is the same as an inclination of the objective image represented by the objective image data obtained by optically reading the manuscript, wherein the inclination correction command is to be executed when a reproduction image is reproduced at a reproduction unit by using the image file, and wherein the reproduction image is different from the objective image represented by the objective image data obtained by optically reading the manuscript.

* * * * *